US012205298B2

United States Patent
Zhao et al.

(10) Patent No.: US 12,205,298 B2
(45) Date of Patent: Jan. 21, 2025

(54) METHOD FOR PROCESSING REMOTE SENSING IMAGES BY FUSING ELEVATION INFORMATION

(71) Applicants: Henan Polytechnic University, Jiaozuo (CN); China Nuclear Industry Survey Design & Research Co.,Ltd., Zhengzhou (CN)

(72) Inventors: Zongze Zhao, Jiaozuo (CN); Changwei Miao, Zhengzhou (CN); Yu Zhang, Zhengzhou (CN); Cheng Wang, Jiaozuo (CN); Chao Ma, Jiaozuo (CN); Guangyuan He, Zhengzhou (CN); Xiaofei Chen, Zhengzhou (CN); Hongtao Wang, Jiaozuo (CN); Weibing Du, Jiaozuo (CN); Shanming Huang, Jiaozuo (CN); Shixuan Li, Zhengzhou (CN); Xiaoqian Cheng, Jiaozuo (CN); Leiku Yang, Jiaozuo (CN)

(73) Assignees: Henan Polytechnic University, Jiaozuo (CN); China Nuclear Industry Survey Design & Research Co.,Ltd., Zhengzhou (CN)

( * ) Notice: Subject to any disclaimer, the term of this patent is extended or adjusted under 35 U.S.C. 154(b) by 0 days.

(21) Appl. No.: 18/805,509

(22) Filed: Aug. 14, 2024

(65) Prior Publication Data
US 2024/0404073 A1 Dec. 5, 2024

Related U.S. Application Data

(63) Continuation of application No. PCT/CN2023/126119, filed on Oct. 24, 2023.

(30) Foreign Application Priority Data

Nov. 23, 2022 (CN) .......................... 202211476563.9

(51) Int. Cl.
G06T 7/187 (2017.01)
G06T 7/11 (2017.01)

(52) U.S. Cl.
CPC ................ G06T 7/187 (2017.01); G06T 7/11 (2017.01); G06T 2207/10028 (2013.01); G06T 2207/10032 (2013.01)

(58) Field of Classification Search
CPC . G06T 7/187; G06T 7/11; G06T 2207/10028; G06T 2207/10032
See application file for complete search history.

(56) References Cited

U.S. PATENT DOCUMENTS

| | | | |
|---|---|---|---|
| 11,710,239 B2* | 7/2023 | Biswas | G06T 5/20 382/100 |
| 2021/0089811 A1* | 3/2021 | Strong | G06V 20/176 |

(Continued)

OTHER PUBLICATIONS

Deng, F. L., et al. "Automated hierarchical segmentation of high-resolution remote sensing imagery with introduced relaxation factors." J. Remote Sens 17 (2013): 1492-1499. (Year: 2013).*

(Continued)

Primary Examiner — Mia M Thomas

(57) ABSTRACT

Disclosed in the present disclosure is a method for processing remote sensing images by fusing elevation information. The method includes the steps: acquiring an image data set, and preprocessing the image data set to obtain an image set; performing simple linear iterative clustering (SLIC) segmentation processing on the image set, introducing elevation information through weighting and setting a threshold in the SLIC segmentation processing process to obtain pre-segmentation results; updating a neighborhood relationship among clusters on the basis of the pre-segmentation results by using a data structure of a neighborhood array, and establishing a comprehensive similarity criterion of weighting combined with elevation features; and finally, for ground (Continued)

objects with complex elevation, setting determination conditions before merging according to elevation differences between adjacent clusters, and performing region merging by setting weight coefficients of different sizes in comprehensive similarity indexes according to determination results to complete image processing.

5 Claims, 31 Drawing Sheets

(56) References Cited

U.S. PATENT DOCUMENTS

| | | | |
|---|---|---|---|
| 2021/0158609 A1* | 5/2021 | Raskob | G06T 17/05 |
| 2022/0398805 A1* | 12/2022 | Raskob | G06V 20/176 |
| 2024/0249518 A1* | 7/2024 | Lorenzen | G06V 10/764 |

OTHER PUBLICATIONS

Shepherd JD, Bunting P, Dymond JR. Operational Large-Scale Segmentation of Imagery Based on Iterative Elimination. Remote Sensing. 2019; 11(6):658. https://doi.org/10.3390/rs11060658 (Year: 2019).*

Csillik, O. Fast Segmentation and Classification of Very High Resolution Remote Sensing Data Using SLIC Superpixels. Remote Sens. 2017, 9, 243. https://doi.org/10.3390/rs9030243 (Year: 2017).*

Dong Zhipeng et al., Image Segmentation of High Resolution Remote Sensing Imagery Based on Simple Linear Iterative Clustering, Remote Sensing Information, Dec. 31, 2016, vol. 31, Issue 6.

* cited by examiner

METHOD FOR PROCESSING REMOTE SENSING IMAGES BY FUSING ELEVATION INFORMATION

TECHNICAL FIELD

The present disclosure relates to a field of remote sensing image processing, and in particular to a method for processing remote sensing images by fusing elevation information.

BACKGROUND

Image segmentation is an important basic processing step in optical remote sensing image interpretation. Superpixel segmentation has become a widely used preprocessing step in the field of computer vision, and color image segmentation is a hot research topic in the field of image vision. An image can be segmented into many clustering regions by using spectral information of remote sensing image data. Since a superpixel region can better reflect a topological structure of the image and provide better local spatial information, a superpixel segmentation method gradually becomes an initial pre-segmentation analysis step of remote sensing image region segmentation or classification. Traditional superpixel segmentation only considers spectral information of ground objects in remote sensing image segmentation, and the segmentation results are not accurate enough for ground objects with certain heights. After superpixel segmentation of image data, a similarity criterion and a merging strategy of adjacent regions may be established to segment objects of different scales accurately. Traditional methods for region merging do not consider elevation information of the ground objects. When spectral characteristics of the ground objects with certain elevation differences are similar, determination results of region merging criteria will be false.

SUMMARY

According to the present disclosure, elevation information is fused on the basis of a traditional remote sensing image segmentation algorithm based on spectral features only, such that accuracy and generalization of large-area remote sensing image segmentation are improved.

To achieve the above objective, the present disclosure provides a method for processing remote sensing images by fusing elevation information. The method includes the steps:
acquiring an image data set, and preprocessing the image data set to obtain an image set;
performing simple linear iterative clustering (SLIC) segmentation processing on the image set, introducing elevation information through weighting and setting a threshold in the SLIC segmentation processing process to obtain pre-segmentation results; and
performing region merging on the basis of the pre-segmentation results to complete image processing.

Optionally, a method for the preprocessing includes: performing gridding on point cloud data with spectral bands in the obtained image data set through point cloud; and further includes: outputting the spectral image data as four-band remote sensing image grid data containing R, G, B and elevation information by fusing a digital surface model to obtain the image set.

Optionally, a method for the SLIC segmentation processing includes: establishing spectral feature vectors and three-dimensional space feature vector among pixel points in a preset range; counting spectral Euclidean distances and three-dimensional space Euclidean distances between each pixel and a cluster center, and allocating the pixels to the segmentation regions with similar features; performing multiple iterations to optimize the cluster center; and traversing the whole domain to remove regions with excessively small sizes.

Optionally, a method for obtaining the pre-segmentation results includes: introducing elevation information into distance calculation and setting a comprehensive threshold of spectral weighting combined with the elevation information during the SLIC segmentation process; and adding elevation information on the basis of a two-dimensional plane and spectral Euclidean distances to establish six-dimensional feature vectors.

Optionally, the spectral Euclidean distances, the two-dimensional plane, and the elevation information are calculated for pixel i and pixel j within an initial superpixel range, expressed as respectively:

$$d_{lab} = \sqrt{(l_i - l_j)^2 + (a_i - a_j)^2 + (b_i - b_j)^2}$$

$$d_{xy} = \sqrt{(x_i - x_j)^2 + (y_i - y_j)^2}$$

$$d_z = z_i - z_j$$

In the formulas, l, a and b represent spectral band values of pixels, x and y represent row and column numbers of pixels, and z represents an elevation value corresponding to the pixel.

Optionally, a method for the region merging includes: establishing similarity indexes fused with elevation information between adjacent super pixels on the basis of the pre-segmentation results, and performing merging region on over-segmented large-scale ground objects; and combining spectral information and elevation information during calculation of the similarity indexes.

Optionally, when the region merging is performed, adjacent clusters are updated in time by using a data structure of a neighborhood array, and labels of adjacent regions are 1stored. by using a list with a variable length, and the region merging has low temporal complexity and low spatial complexity when being determined.

Optionally, a method for establishing the similarity index includes: using a data structure of a neighborhood array (NA), and separately establishing a list with a variable length in each region for storing labels of adjacent regions.

Compared with the prior art, the present disclosure has following beneficial effects:

According to the present disclosure, firstly, the elevation information is introduced in the superpixel pre-segmentation step, such that false segmentation caused by independence only on spectral information is effectively overcome, and accuracy of remote sensing image segmentation is improved, thereby updating a neighborhood relationship among clusters on the basis of the pre-segmentation results by using a the data structure of the neighborhood array, and establishing a comprehensive similarity criterion of weighting combined with elevation features. Finally, for ground objects with complex elevation, determination conditions before merging are set according to elevation differences between adjacent clusters, and region merging is performed by setting weight coefficients of different sizes in the comprehensive similarity indexes according to determination results. The results are compared and analyzed by a visual method. Experimental results show that the present disclosure has certain generalization. Compared with the traditional remote sensing image segmentation and region merging application based only on a spectral information threshold, segmentation results of large-area remote sensing image with complex spectral information and elevation information is more relatively accurate.

BRIEF DESCRIPTION OF THE DRAWINGS

To describe the technical solutions in the embodiments of the present disclosure or in the prior art more clearly, the following briefly describes the accompanying drawings required in the embodiments. Apparently, the accompanying drawings in the following descriptions show merely some embodiments of the present disclosure, Embodiment 1 is an example of initial segmentation, and Embodiment 2 is an example of region merging. Those of ordinary skill in the art can still derive other accompanying drawings from these accompanying drawings without creative efforts.

DETAILED DESCRIPTION OF THE EMBODIMENTS

The following clearly and completely describes the technical solutions of the embodiments of the present disclosure in conjunction with the accompanying drawings in the embodiments of the present disclosure. Apparently, the embodiments described are merely some embodiments rather than all embodiments of the present disclosure. Based on the embodiments of the present disclosure, all other embodiments obtained by those of ordinary skill in the art without making creative efforts fall within the scope of protection of the present disclosure.

To make the above-mentioned objective, features and advantages of the present disclosure clearer and more comprehensible, the following will further describe the present disclosure in detail with reference to the accompanying drawings and particular implementations.

Figure 2A:
FIG. 2A is a schematic diagram of Hessigheim 3D (H3D) point cloud gridding data of Embodiment 1 and Embodiment 2 of the present disclosure.
Figure 2B:
FIG. 2B is a schematic diagram of post-earthquake remote sensing image data fused with a digital surface model (DSM).
Figure 2C:
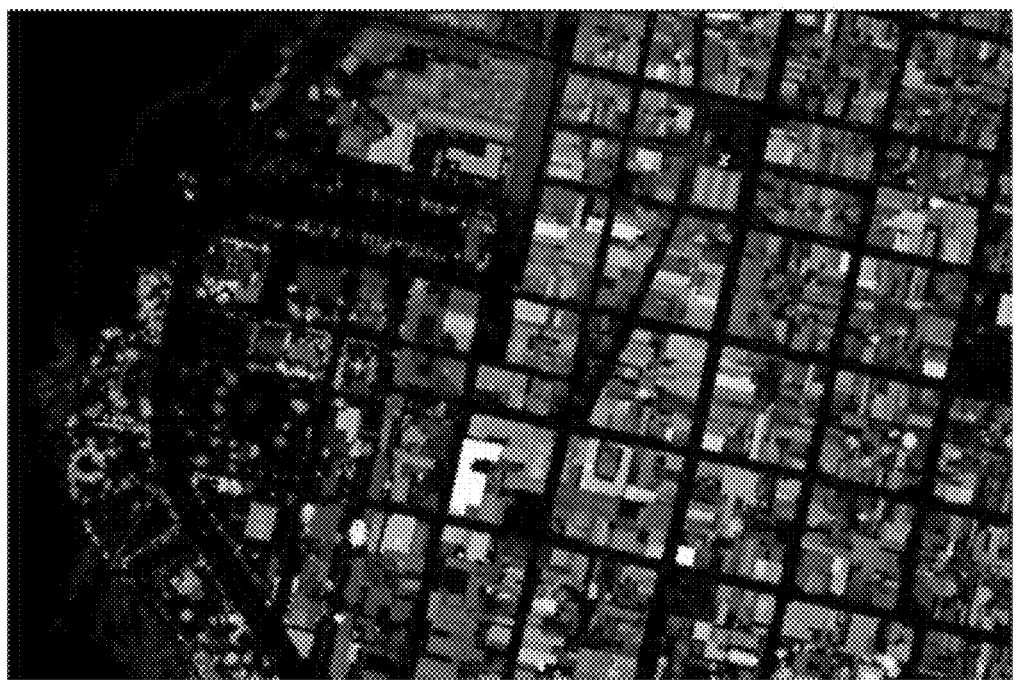
FIG. 2C is a schematic diagram of a post-earthquake region fused with DSM.

The technical effects of the present disclosure will be described in detail below through experiments in combination with an initial segmentation example in Embodiment 1 and a region merging example in Embodiment 2. Firstly, the public data set of the International Society for Photogrammetry and Remote Sensing (ISPRS) of Hessigheim 3D (H3D) laser point cloud and 3D texture meshes are acquired. The average density of the point cloud in this data set is about 800 points per square meter. In Embodiment 1 and Embodiment 2, the data are the point cloud data intercepted from partial regions of the village of Hessigheim with a large number of buildings in March 2019. The point cloud data with spectral bands are output as remote sensing image grid data containing four bands of R, G, B and elevation information through point cloud gridding, where the size of an image grid is 2519 pixels*2055 pixels. Experimental data set 2 is the post-earthquake low-altitude remote sensing image data fused with a digital surface model (DSM), the bands of each pixel are R, G, B and elevation bands respectively, and the size of the image grid is 2377 pixels*3553 pixels, as shown in FIG. 2.

Figure 1:
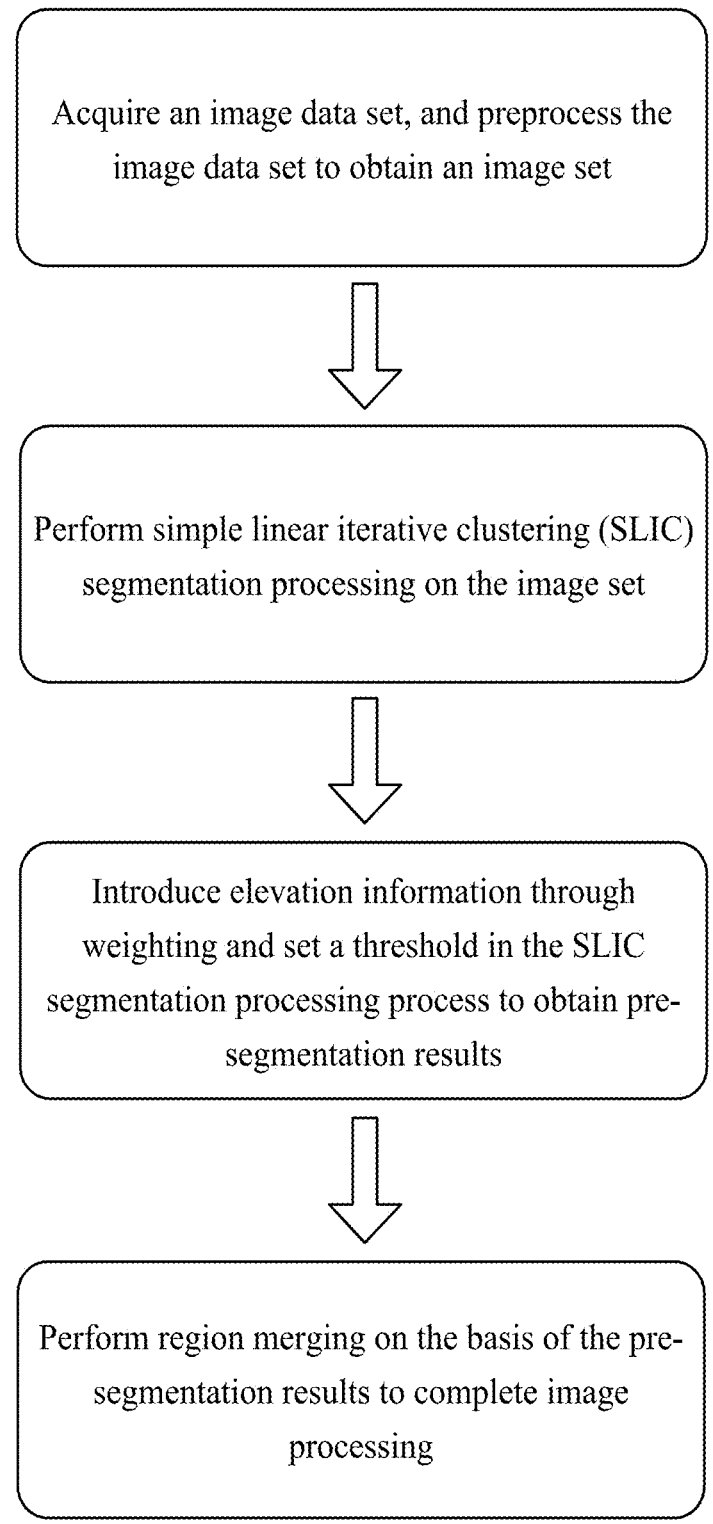
FIG. 1 is a schematic flowchart of methods in Embodiment 1 and Embodiment 2 of the present disclosure.

FIG. 1 shows a schematic flowchart of methods in Embodiment 1 and Embodiment 2 of the present disclosure. The method includes the steps: acquire an image data set, and preprocess the image data set to obtain an image set; perform simple linear iterative clustering (SLIC) segmentation processing on the image set; introduce elevation information through weighting and set a threshold in the SLIC segmentation processing process to obtain pre-segmentation results; and perform region merging on the basis of the pre-segmentation results to complete image processing.

Embodiment 1

Firstly, a collected image data set is preprocessed, and point cloud data with spectral bands are output as four-band remote sensing image grid data containing R, G, B and elevation information. For the spectral remote sensing image data, the spectral image data are fused with DSM to obtain a multi-band image grid containing elevation information to obtain an image set.

Then, SLIC (Simple Linear Iterative Clustering) segmentation processing is performed on the image set. A method for the SLIC processing includes the basic steps: specify spectral and planar space feature vectors in a specific range; calculate an Euclidean distance between each pixel and a cluster center, comparing the distance with a preset value, and assign the pixels to segmentation regions with similar features; optimize the cluster center through multiple iterations because the initial cluster center is uniformly distributed and the search range is limited to a fixed radius of the cluster center; and finally, traverse the whole domain to remove regions with excessively small sizes, thereby effectively solving the problem of "salt-and-pepper noise" caused by a pixel-level segmentation strategy.

In the above SLIC segmentation process, when the distance is calculated, the elevation information is introduced through weighting, and the appropriate threshold is set to achieve a more accurate segmentation effect. The SLIC segmentation method for low-altitude remote sensing images by fusing elevation information adds elevation information to establish a six-dimensional feature vector [l a b x y z] on the basis of the two-dimensional plane and the spectral Euclidean distance, where l, a and b represent spectral band values (assumed to be three bands) of pixels, x and y represent row and column numbers of pixels respectively, and z represents an elevation value corresponding to the pixel. Therefore, the spectral, planar and elevation distances between pixel i and pixel j can be expressed as:

$$d_{lab} = \sqrt{(l_i-l_j)^2+(a_i-a_j)^2+(b_i-b_j)^2} \quad (1)$$

$$d_{xy} = \sqrt{(x_i-x_j)^2+(y_i-y_j)^2} \quad (2)$$

$$d_z = z_i - z_j \quad (3)$$

An elevation distance measure is introduced into a feature similarity measure $D_z$, and calculation formula is as follows:

$$D_z = \sqrt{\left(\frac{d_{lab}}{m}\right)^2 + \left(\frac{d_{xy}}{s}\right)^2 + \left(\frac{d_z}{\lambda}\right)^2} \quad (4)$$

In the formula (4), m represents the spectral weight, s represents the step size, and $\lambda$ represents the elevation weight.

Figure 3A:
FIG. 3A is a schematic diagram of results of a traditional simple linear iterative clustering (SLIC) segmentation based on spectral information of H3D data.
Figure 3B:
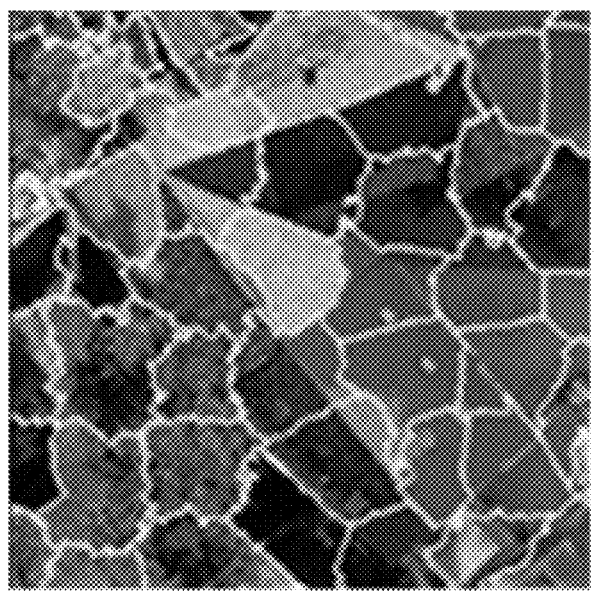
FIG. 3B is a schematic diagram partially cut from FIG. 3A.
Figure 3C:
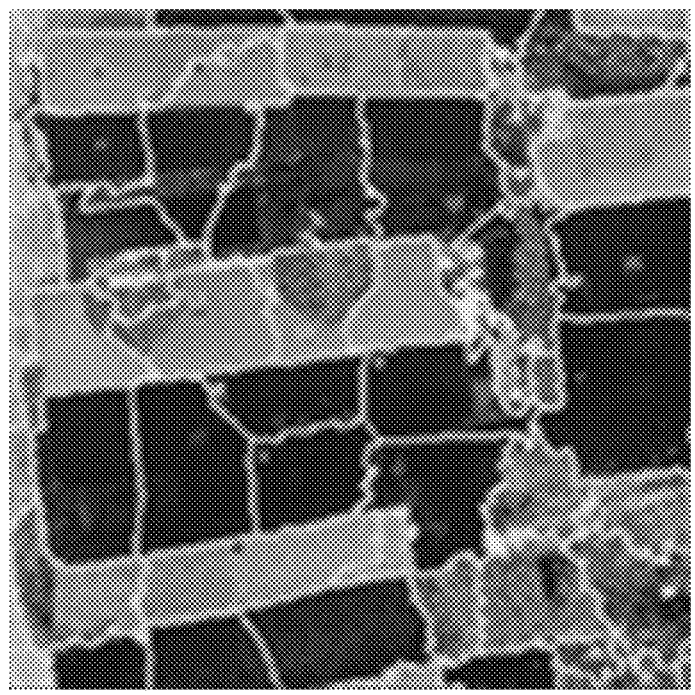
FIG. 3C is a schematic diagram partially cut from FIG. 3A.
Figure 3D:
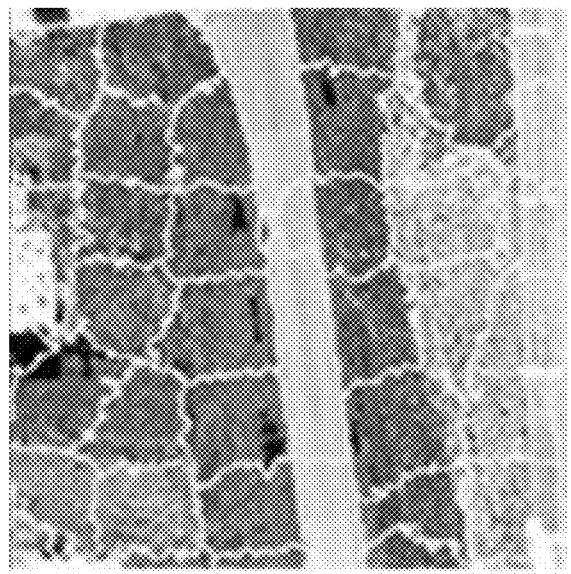
FIG. 3D is a schematic diagram partially cut from FIG. 3A.
Figure 3E:
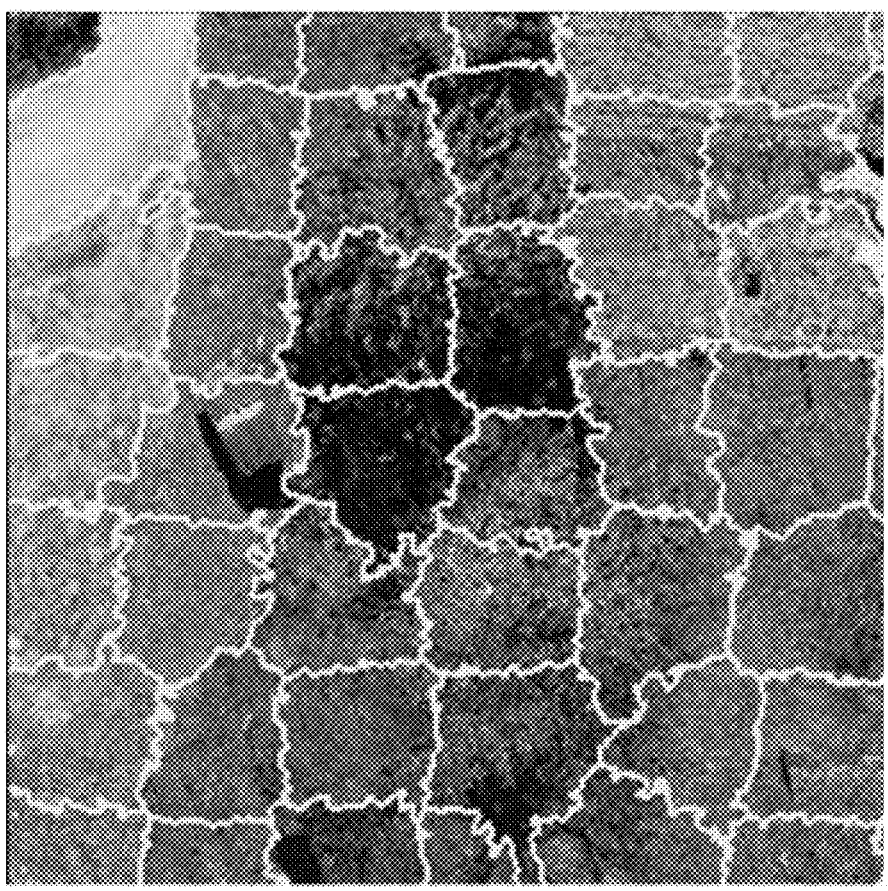
FIG. 3E is a schematic diagram partially cut from FIG. 3A.
Figure 4A:
FIG. 4A is a schematic diagram of results of SLIC segmentation of H3D data after fusion with elevation information.
Figure 4B:
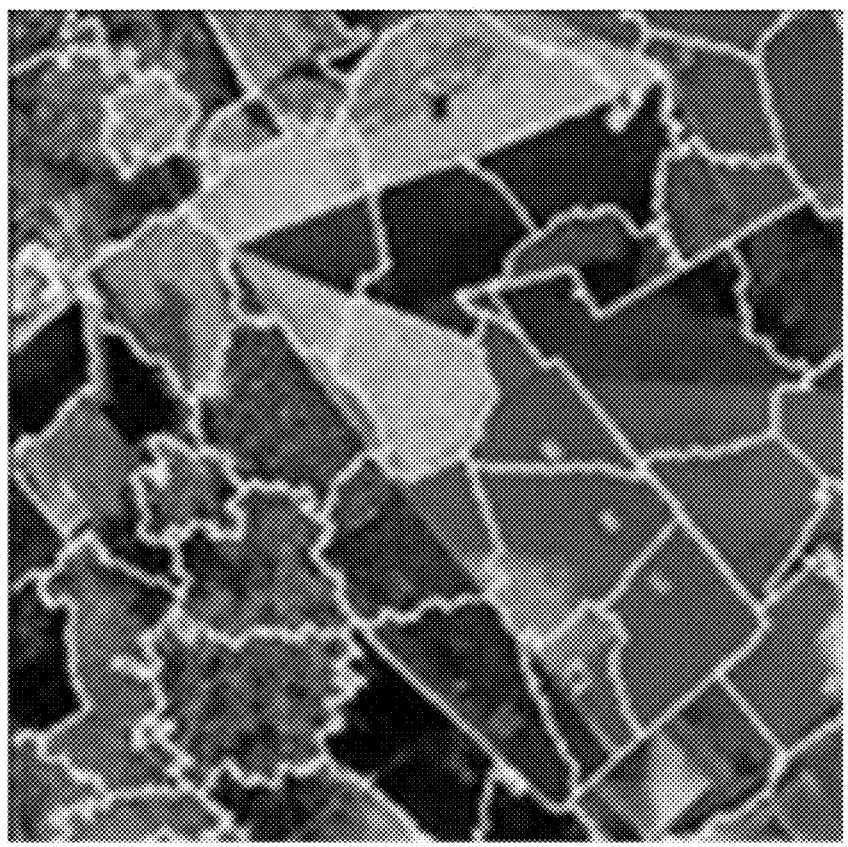
FIG. 4B is a schematic diagram partially cut from FIG. 4A.
Figure 4C:
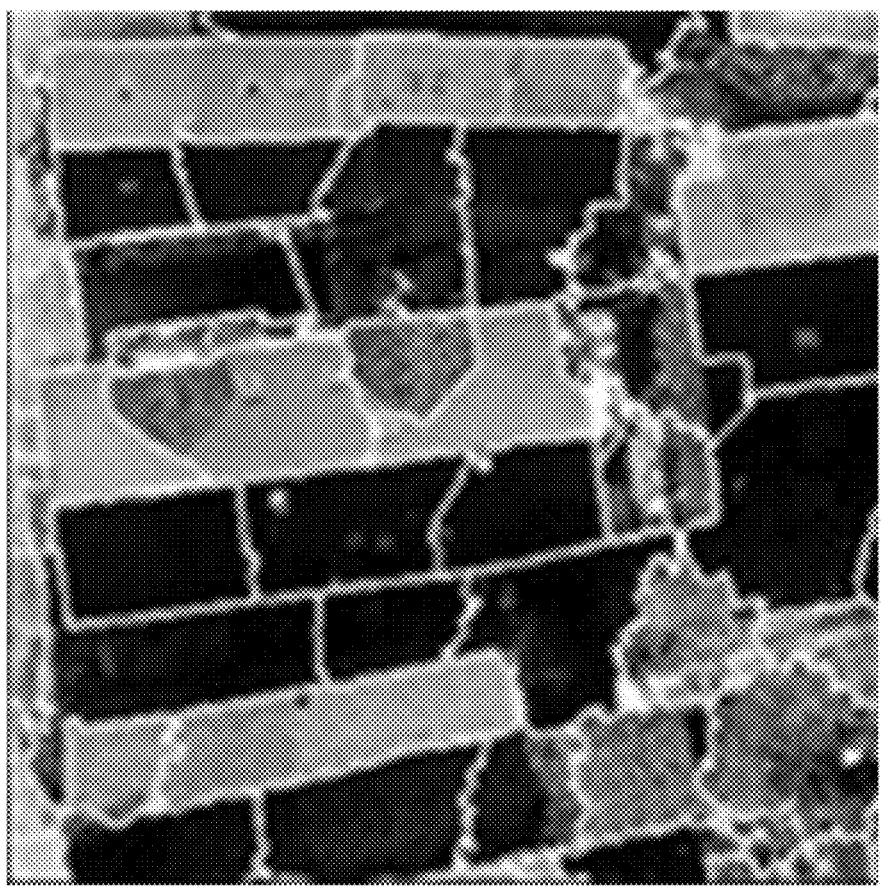
FIG. 4C is a schematic diagram partially cut from FIG. 4A.
Figure 4D:
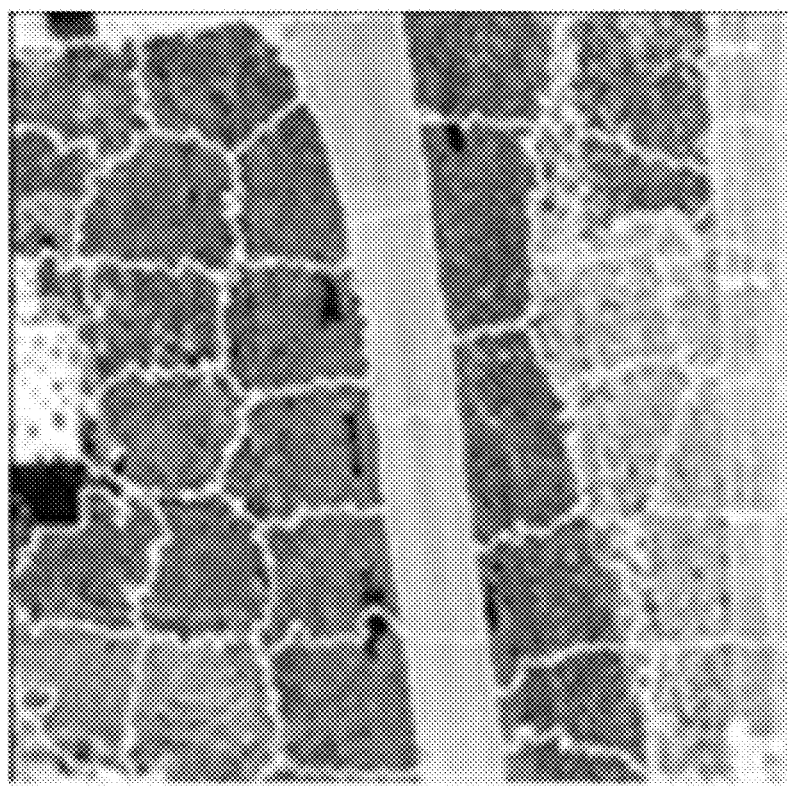
FIG. 4D is a schematic diagram partially cut from FIG. 4A.
Figure 4E:
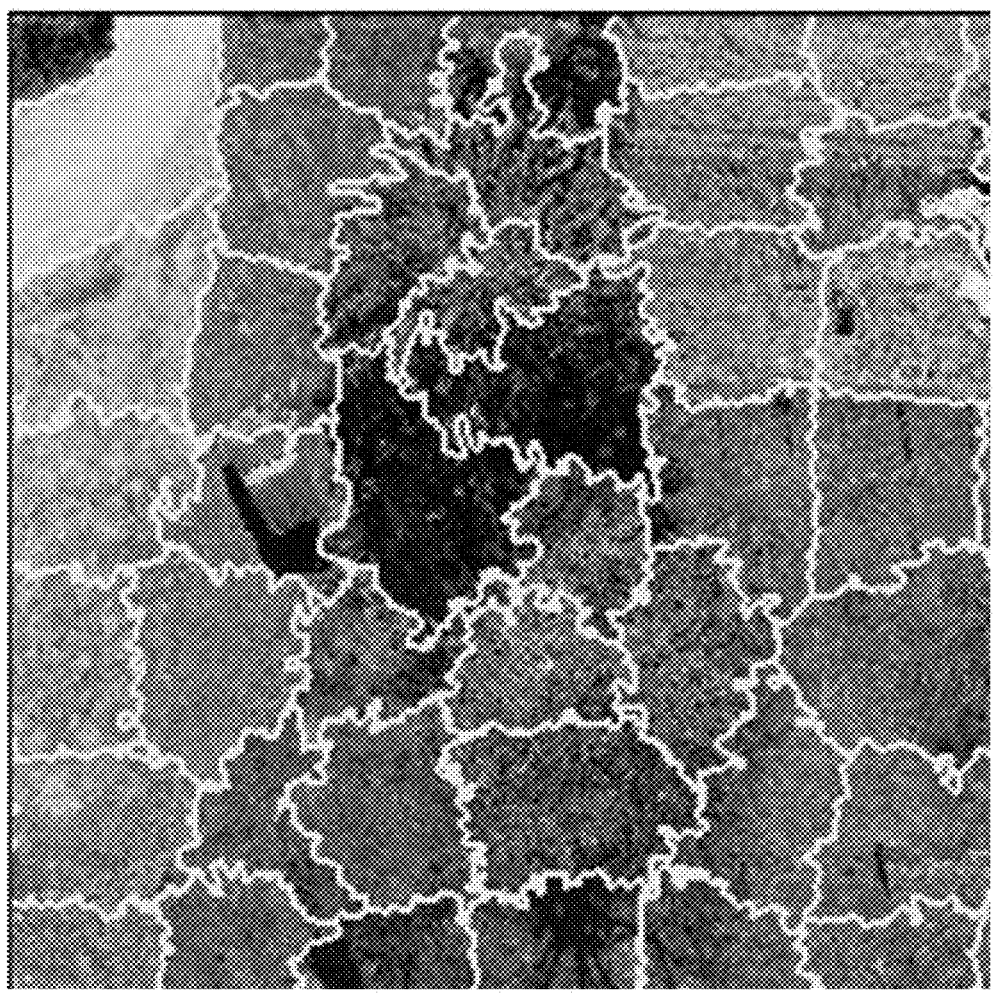
FIG. 4E is a schematic diagram partially cut from FIG. 4A.

In this embodiment, the original SLIC superpixel segmentation algorithm (m=80, k=2000) is compared with the initial segmentation algorithm (m=80, k=2000, $\lambda$=5) after elevation information is introduced, and an initial segmentation experiment is performed on H3D experimental data and post-earthquake low-altitude remote sensing image data fused with DSM. The results of the initial segmentation experiment and the comparison results of typical ground objects are shown in the figures. FIG. 3A is a schematic diagram of results of a traditional simple linear iterative clustering (SLIC) segmentation based on spectral information of H3D data; FIG. 4A is a schematic diagram of results of SLIC segmentation of H3D data after fusion with elevation information. FIG. 3B, FIG. 3C, FIG. 3D, and FIG. 3E are all taken from FIG. 3A; FIG. 4B, FIG. 4C, FIG. 4D, and FIG. 4E are all taken from FIG. 4A.

It can be seen from the initial segmentation experiment result diagrams that the method of this embodiment also has certain generalization ability for image segmentation of large-area ground objects. It can be seen that after the elevation information is introduced into the segmentation method, for buildings with complex spectral information (contrast between FIG. 3B and FIG. 4B), false segmentation caused by problems such as light and shade can be avoided, and building boundaries are accurately fitted. For ground objects in shadow regions (contrast between FIG. 3C and FIG. 4C), the situation that it is difficult to perform division only by the spectrum is avoided, and the ground objects with certain heights in the shadow regions are accurately recognized. For some regions on which similarity determination is performed only by the spectral features and are similar to other ground objects, such as roads and light-colored grasslands (contrast between FIG. 3D and FIG. 4D), more ground object information can be obtained, and division can be accurately performed. For trees and grasslands of spectrally similar vegetation regions (contrast between FIG. 3E with FIG. 4E), boundaries of the trees can be fitted by information such as the elevation difference between the trees and the grasslands. For local buildings in post-earthquake images (contrast between FIG. 5B, FIG. 5C, FIG. 5D, FIG. 5E and FIG. 6B, FIG. 6C, FIG. 6D, FIG. 6E), even if the region has complex spectral information, the building boundary can still be fitted well. Therefore, in the face of a large-range region with complex spectral information and elevation information, the method of this embodiment has a better fitting effect on the ground object boundary. For the traditional threshold segmentation based on gray gradients, the ground objects which are located in the shadow region and have surfaces with complex spectral information and uneven top surfaces will cause in false segmentation. The threshold segmentation of remote sensing images proposed in this disclosure can overcome the influence of light shadow and brightness to some extent. When the elevation difference is not large, the smaller the spectral difference, the greater the possibility of belonging to the same ground object. When the elevation difference is relatively large, spectral features are not much different, so the elevation difference can be used for determining the similarity of pixels. When it is difficult to distinguish depending on spectral information, the elevation information is effectively used for fitting the ground object boundary accurately. Since the final segmentation results of ground objects are merged by superpixels of pre-segmentation, the segmentation quality of the pre-segmentation step has decisive significance. The pre-segmentation experiment results show that the initial segmentation method of introducing elevation information in Embodiment 1 is suitable as the basic step of subsequent region merging in Embodiment 2.

Embodiment 2

After that, on the basis of the pre-segmentation results of Embodiment 1, region merging of Embodiment 2 is performed to establish similarity indexes between adjacent superpixels, and the over-segmented large-scale ground objects are merged, which can effectively improve the visual effect of the segmentation results and the segmentation accuracy of the ground objects. The specific steps include:

1) Record Adjacent Regions by Neighborhood List

Figure 7A:
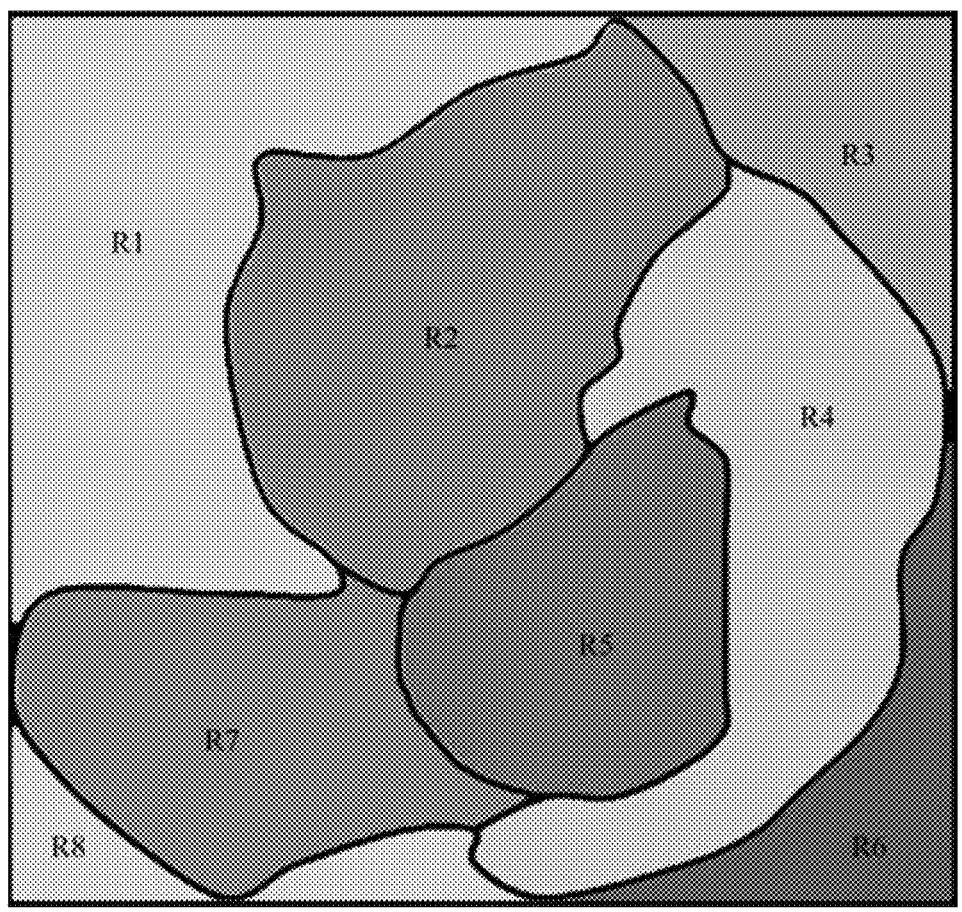
FIG. 7A is a schematic diagram before region merging employed in Embodiment 2 of the present disclosure.
Figure 7B:
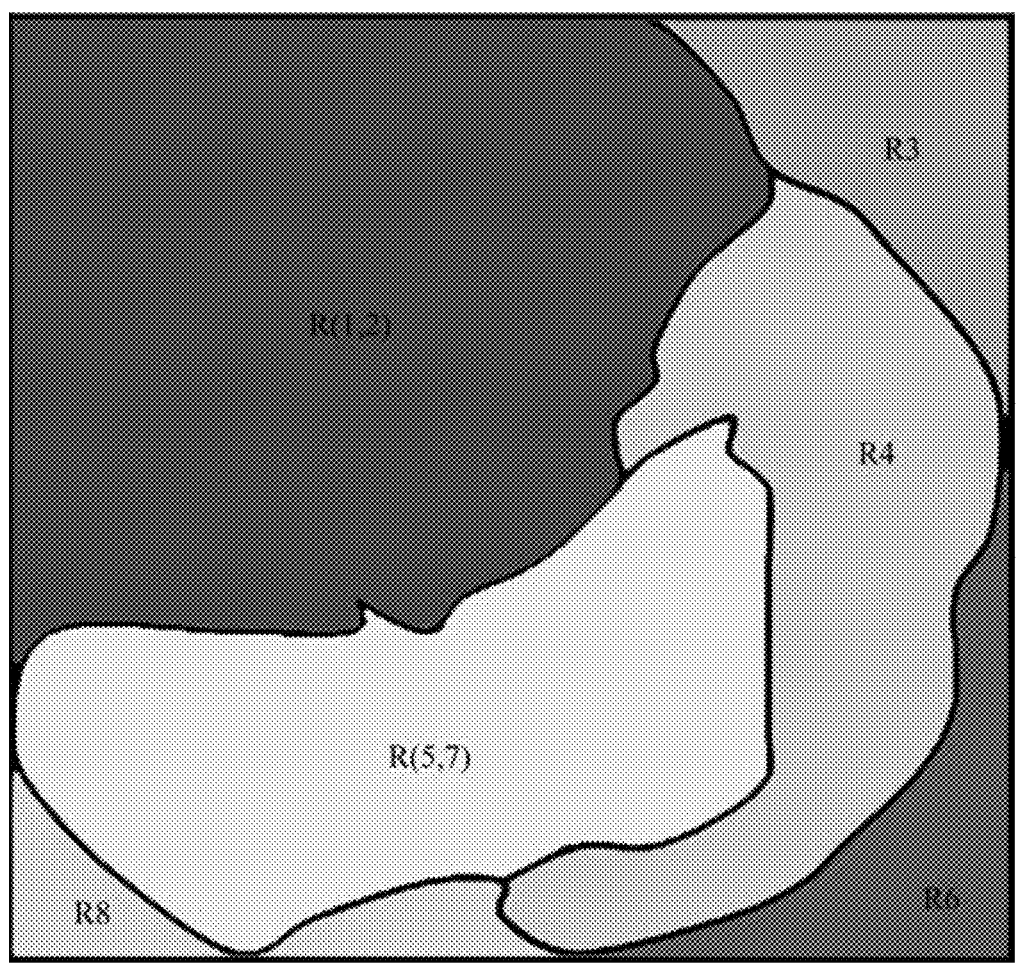
FIG. 7B is a schematic diagram after region merging employed in Embodiment 2 of the present disclosure.
Figure 8A:
FIG. 8A is a local graph of a building roof and a road surface after region merging of Embodiment 2 performed on the basis of results obtained after segmentation in Embodiment 1 of H3D data employed by the present disclosure.
Figure 8B:
FIG. 8B is a local graph of ground objects with different height differences after region merging of Embodiment 2 performed on the basis of results obtained after segmentation in Embodiment 1 of H3D data employed by the present disclosure.
Figure 8C:
FIG. 8C is a local graph of a lawn after region merging of Embodiment 2 performed on the basis of results obtained after segmentation in Embodiment 1 of H3D data employed by the present disclosure.
Figure 8D:
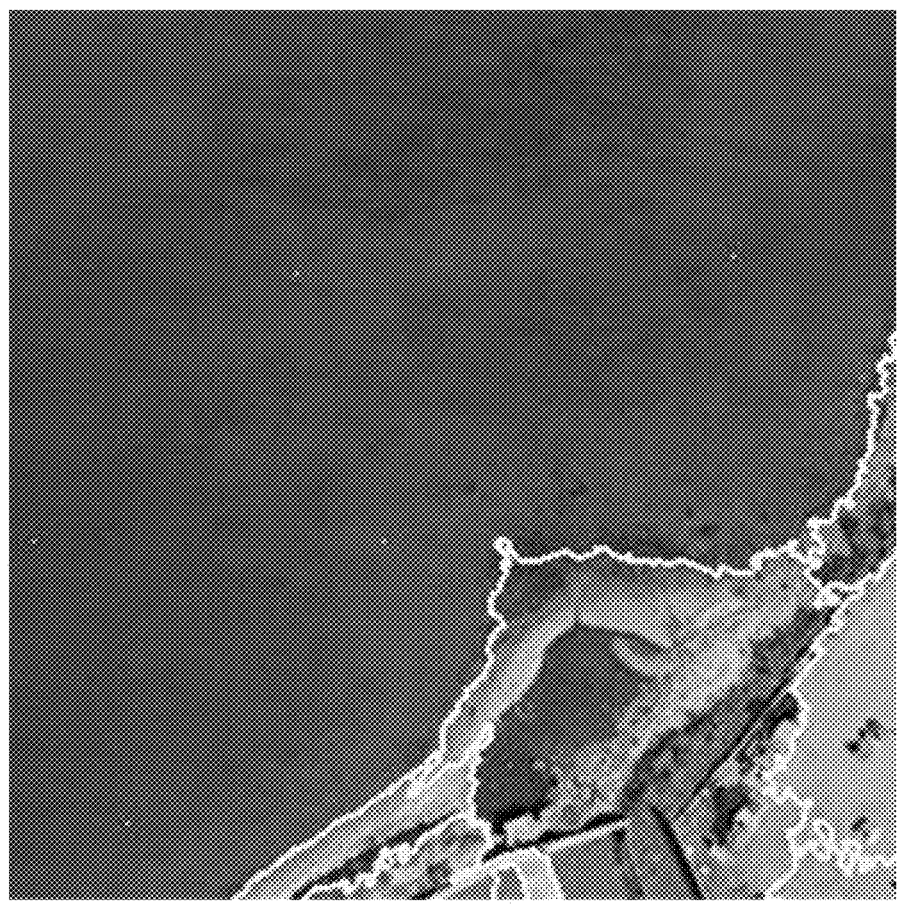
FIG. 8D is a local graph of a water surface after region merging of Embodiment 2 performed on the basis of results obtained after segmentation in Embodiment 1 of post-earthquake image data fused with DSM employed by the present disclosure.
Figure 8E:
FIG. 8E is a local graph of a building region after region merging of Embodiment 2 performed on the basis of results obtained after segmentation in Embodiment 1 of post-earthquake image data fused with DSM employed by the present disclosure.

In this embodiment, a data structure of a neighborhood array (NA) with higher computational efficiency is employed. Adjacency schematic diagrams in FIG. 7A and FIG. 7B, and the region adjacency list in Table 1 show that each region separately establishes a variable-length list Li to store adjacent region labels. This data structure only needs to traverse the current region. Compared with RAG, which needs to traverse the whole domain, the length is reduced. After merging, the length of some region lists and the number of regions are reduced, which increases the efficiency of the region merging algorithm. By setting the merging threshold, the container that records each region's neighborhood is constantly updated at merging criterion determination time, with relatively low temporal and spatial complexity.

TABLE 1

| Before merging | | After merging | |
|---|---|---|---|
| List | Adjacency list | List | Adjacency list |
| $L_{R1}$ | [R2 R7] | $L_{R(1,2)}$ | [R3 R4 R(5,7)] |
| $L_{R2}$ | [R1 R3 R4 R5 R7] | $L_{R3}$ | [R(1,2) R4] |
| $L_{R3}$ | [R2 R4] | $L_{R4}$ | [R(1,2) R3 R(5,7) R6] |
| $L_{R4}$ | [R2 R3 R5 R6 R7 R8] | $L_{R(5,7)}$ | [R(1,2) R4 R8] |
| $L_{R5}$ | [R2 R4 R7] | $L_{R6}$ | [R4] |
| $L_{R6}$ | [R4] | $L_{R8}$ | [R4 R(5,7)] |
| $L_{R7}$ | [R1 R2 R4 R5 R8] | — | — |
| $L_{R8}$ | [R4 R7] | | |

2) Dual-Threshold Merging Strategy for Elevation Classification

For remote sensing images, regional similarity criteria can be considered by integrating various image features. After SLIC segmentation of the regions, the spectral mean and elevation mean of all pixels in each segmented region can be counted as an attribute value of the segmented region. The statistical formula for the mean attribute $B_r^i$ of the i band of the segmented region r is:

$$B_r^i = \frac{1}{n}\sum_{k=1}^{n} B_k^i \qquad (5)$$

Therefore, for the initial segmentation results of the image data of the four bands in this embodiment, the similarity may be calculated through the spectral and elevation mean attribute values of each segmented region, and the similarity index $C_{i,j}$ of the spectrally weighted fusion elevation is established from the spectral similarity $C_{i,j}^{rgb}$ and the elevation similarity $\beta C_{i,j}^{elevation}$ of adjacent regions i and j. Calculation formulas are as follows:

$$C_{i,j}^{rgb} = (B_i^1 - B_j^1)^2 + (B_i^2 - B_j^2)^2 + (B_i^3 - B_j^3)^2 \qquad (6)$$

$$C_{i,j}^{elevation} = \delta(B_i^4 - B_j^4)^2 \qquad (7)$$

$$C_{i,j} = \sqrt{\alpha C_{i,j}^{rgb} + \beta C_{i,j}^{elevation}} \qquad (8)$$

In the formulas, $\alpha$ represents the spectral feature weight, and $\beta$ represents the elevation feature weight. The coefficient $\delta$ ($\delta$ being set 10 in this embodiment) is set to maintain the unity of the spectral and elevation similarity measures in numerical dimensions, such that respective degrees of change approximately maintain the same degree of change in numerical values brought to the comprehensive similarity. When a single similarity threshold T is set, different spectral and elevation feature weights will be caused, but the statistical similarity measures $C_{i,j}^1$ are the same in value, resulting in a region merging error. For remote sensing image ground object segmentation processing, the smaller the height difference between ground objects, the greater the possibility of belonging to the same ground object. On the contrary, the greater the elevation difference, the smaller the possibility of belonging to the same ground object. Therefore, in this embodiment, a dual-threshold merging strategy for elevation classification is proposed by combining the similarity indexes $C_{i,j}^1$ and $C_{i,j}^2$ of different weight coefficients of spectrum and elevation.

Aiming at the deficiency of using spatial information based on spectral similarity and the weak robustness of combining spectral information with elevation information based on a single threshold, the elevation threshold T is introduced in the dual-threshold merging strategy for elevation classification as the determination condition before merging according to similarity threshold T before merging. $Z_{i,j}$ is the absolute value of an average elevation attribute difference between two adjacent clusters. When $Z_{i,j}$ is less than $T_z$, the similarity degree of adjacent clusters is calculated by the similarity index $C_{i,j}^1$. In this case, the spectral similarity index weight $\alpha$ is set larger, otherwise, the similarity index $C_{i,j}^2$ is employed, and the elevation similarity index $\beta$ is set larger. If the similarity index is less than T, the region merge statement is executed. $\theta$ is the self-increasing coefficient (set to 1.2 in this embodiment) of the threshold, and the threshold T iteratively is self-increased with the increase of the merging scale of each iteration. The main flow of the region merging method in Embodiment 2 is shown in Table 2.

TABLE 2

Algorithm

Figure 5A:
FIG. 5A is a schematic diagram of results of SLIC segmentation of post-earthquake remote sensing image data.
Figure 5B:
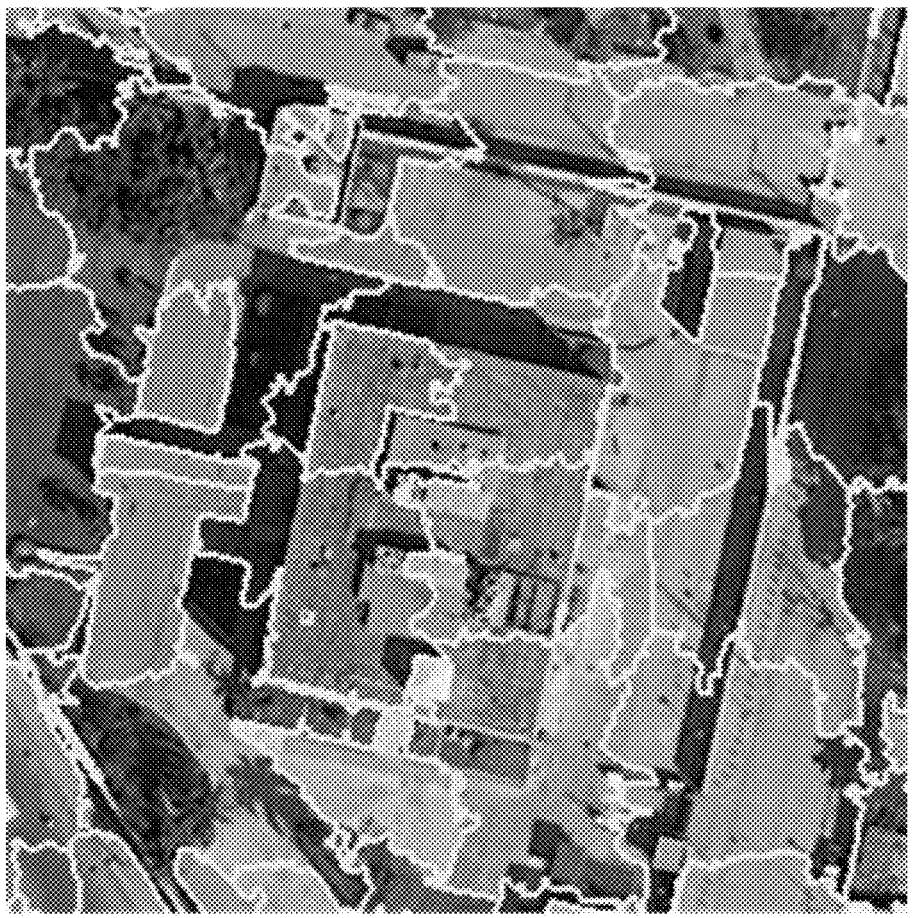
FIG. 5B is a schematic diagram partially cut from FIG. 5A.
Figure 5C:
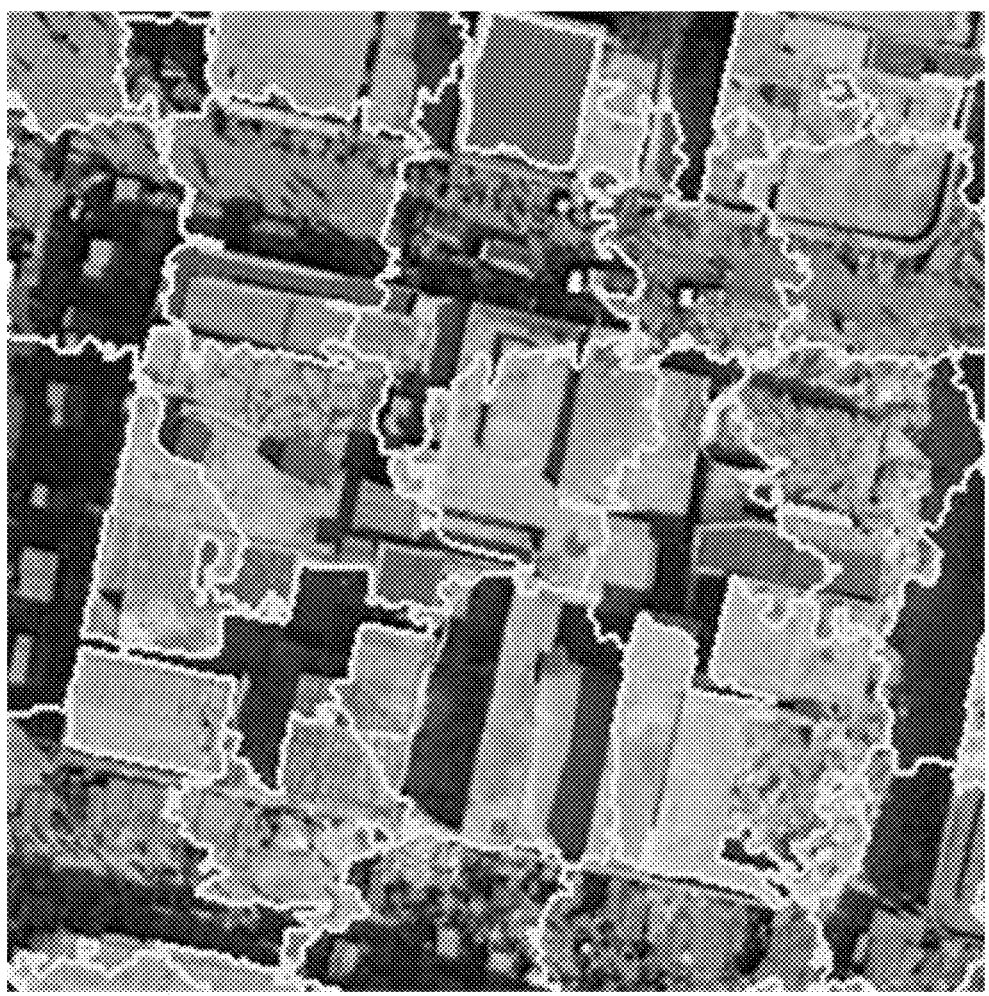
FIG. 5C is a schematic diagram partially cut from FIG. 5A.
Figure 5D:
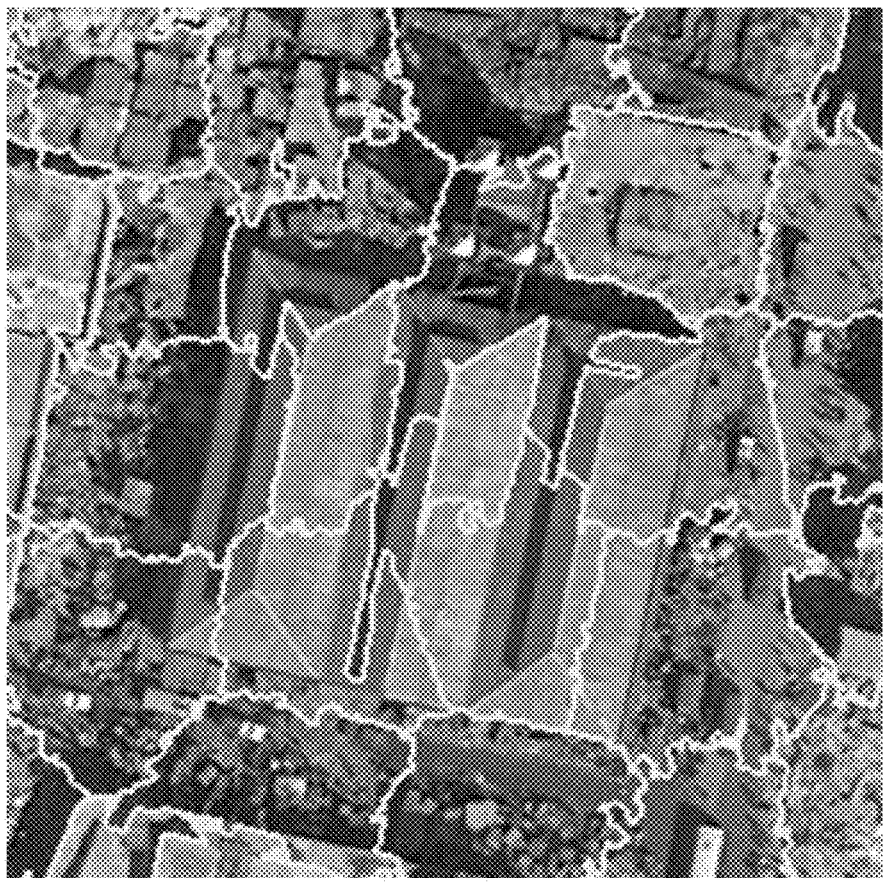
FIG. 5D is a schematic diagram partially cut from FIG. 5A.
Figure 5E:
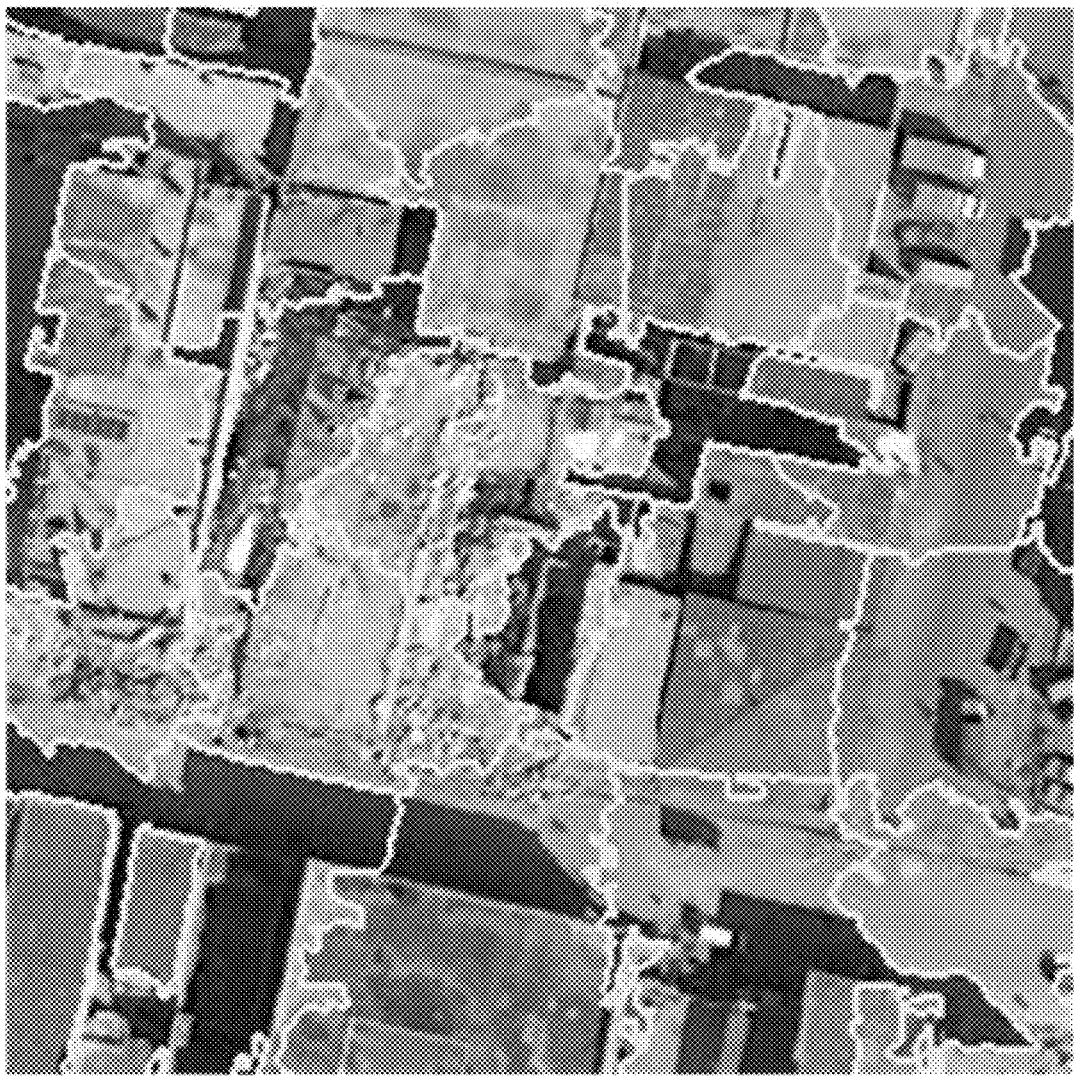
FIG. 5E is a schematic diagram partially cut from FIG. 5A.
Figure 6A:
FIG. 6A is a schematic diagram of results of SLIC segmentation of post-earthquake remote sensing image data fused with elevation information.
Figure 6B:
FIG. 6B is a schematic diagram partially cut from FIG. 6A.
Figure 6C:
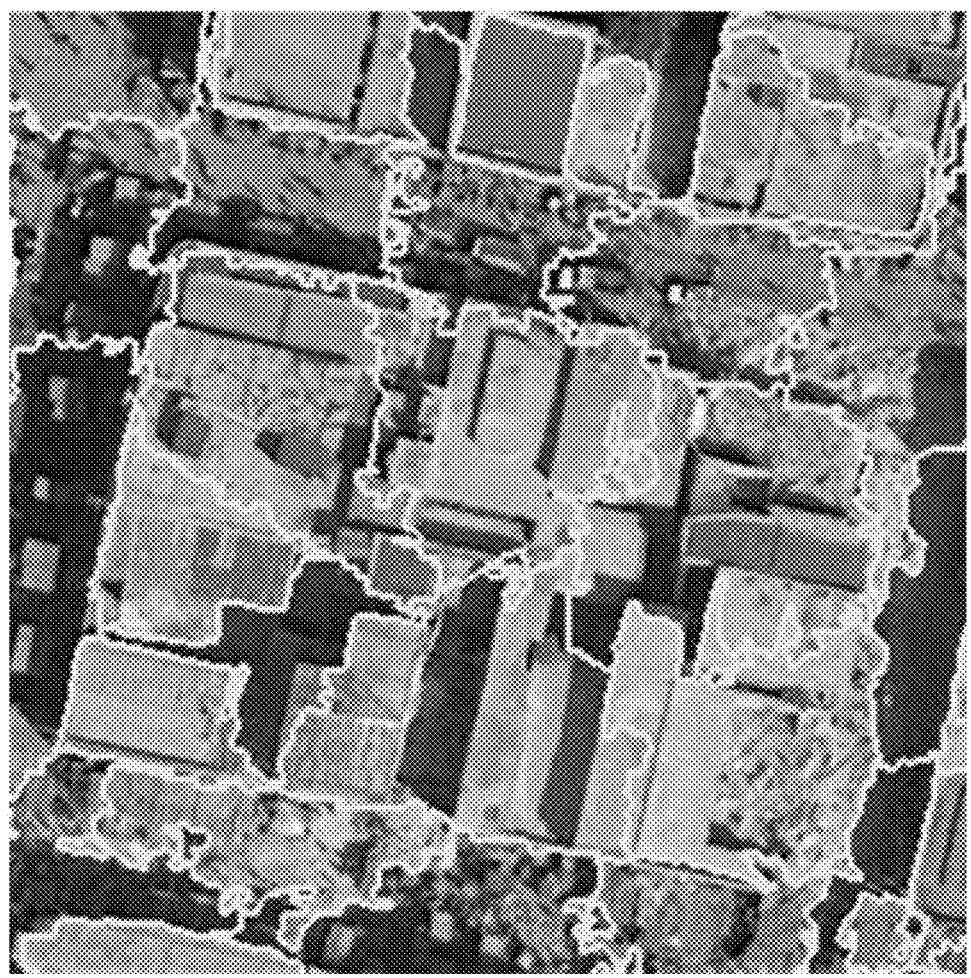
FIG. 6C is a schematic diagram partially cut from FIG. 6A.
Figure 6D:
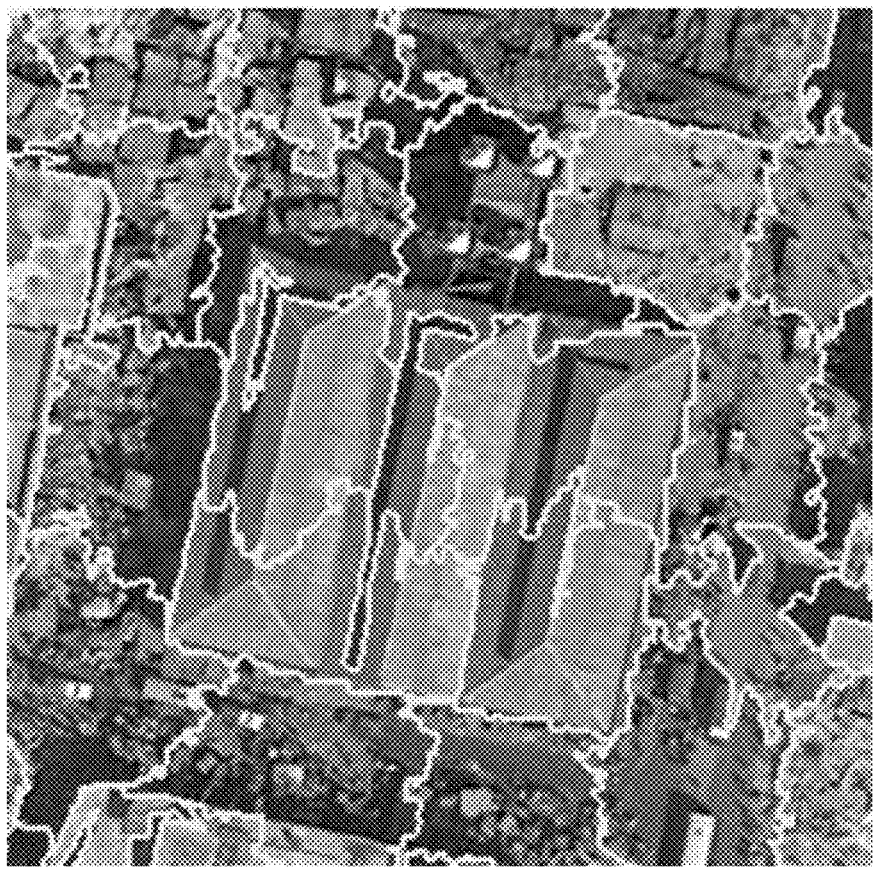
FIG. 6D is a schematic diagram partially cut from FIG. 6A.
Figure 6E:
FIG. 6E is a schematic diagram partially cut from FIG. 6A.

//$T$ being similarity threshold;
//$T_z$ being elevation threshold;
//$Z_{i,j}$ being elevation attribute difference between adjacent clusters;
//$C_{i,j}^1$ and $C_{i,j}^2$ being similarity indexes;
//$\theta$ being self-increasing coefficient of threshold;
Repeat
/*region merging*/
for each cluster update the adjacent list
for each cluster do
    compute the $C_{i,j}$ between cluster and adjacent clusters
    if $Z_{i,j}$ < $T_z$ then
      if $C_{i,j}^1$ < T then
        do merge
      end if
    else
      if $C_{i,j}^2$ < T then
        do merge
      end if
end for
$\theta T = T$
end for FIG. 8A, FIG. 8B, FIG. 8C, FIG. 8D, and FIG. 8E show segmentation and merging results of local typical ground objects of two data sets. FIG. 5A is a schematic diagram of results of SLIC segmentation of post-earthquake remote sensing image data; FIG. 6A is a schematic diagram of results of SLIC segmentation of post-earthquake remote sensing image data fused with elevation information. FIG. 5B, FIG. 5C, FIG. 5D, and FIG. 5E are all taken from FIG. 5A; FIG. 6B, FIG. 6C, FIG. 6D, and FIG. 6E are all taken from FIG. 6A. It can be seen from FIG. 8A and FIG. 8B that in the traditional similarity criterion based on spectral features, after elevation features are introduced, when the top surface region of a building and the ground region are similar in spectrum, distinction can be made by the elevation attribute difference between the regions. For example, the road in shadow in a rectangle is similar in spectrum to the building, but the elevation difference is large, so distinction can be made by the elevation attribute. It can be seen from FIG. 8C and FIG. 8D that the boundary of a grassland and the boundary of a water surface can be fitted accurately, and trees and grasslands with certain heights in the rectangle do not have false merging. It can be seen from FIG. 8E that in the face of regions with complex spectral information and elevation information, the boundary of the building region can also be kept relatively complete. Therefore, in the processing process, there is no false merging phenomenon, and better segmentation results can be obtained. Based on the pre-segmentation with elevation information fused in this embodiment, the regional similarity index of the spectral information weighted in combination with the elevation information is established, the elevation change of the ground object is considered, and the image data information is more fully utilized. Different thresholds are set for the elevation, the regional merging processing is performed by employing the strategy based on the elevation threshold classification, the large-area image has certain generalization ability, and the ground object with complex spectrum and elevation information can be segmented accurately.

The above-described embodiments are only a description of preferred manners of the present disclosure and do not limit the scope of the present disclosure, and various variations and modifications made by those of ordinary skill in the art to the technical solutions of the present disclosure are intended to fall within the protection scope defined by the claims of the present disclosure without departing from the design spirit of the present disclosure.

What is claimed is:

1. A method for processing remote sensing images by fusing elevation information, comprising the steps:
acquiring an image data set, and preprocessing the image data set to obtain an image set;
performing SLIC segmentation processing on the image set, introducing elevation information through weighting and setting a threshold in the SLIC segmentation processing process to obtain pre-segmentation results;
a method for the SLIC segmentation processing comprising: establishing spectral feature vectors and three-dimensional space feature vector among pixel points in a preset range; counting spectral Euclidean distances and three-dimensional space Euclidean distances between each pixel and a cluster center, and allocating the pixels to the segmentation regions with similar features; performing multiple iterations to optimize the cluster center; traversing the whole domain to remove regions with excessively small sizes;
performing region merging on the basis of the pre-segmentation results to complete image processing;
a method for obtaining the pre-segmentation results comprising: introducing elevation information into distance calculation and setting a comprehensive threshold of spectral weighting combined with the elevation information during the SLIC segmentation process; adding elevation information on the basis of a two-dimensional plane and spectral Euclidean distances to establish six-dimensional feature vectors; and
calculating the spectral Euclidean distances, the two-dimensional plane, and the elevation information for pixel i and pixel j within an initial superpixel range, expressed as respectively:

$$d_{lab}=\sqrt{(l_i-l_j)^2+(a_i-a_j)^2+(b_i-b_j)^2}$$

$$d_{xy}=\sqrt{(x_i-x_j)^2+(y_i-y_j)^2}$$

$$d_z=z_i-z_j$$

in the formulas, l, a and b represent spectral band values of pixels, x and y represent row and column numbers of pixels, and z represents an elevation value corresponding to the pixel.

2. The method for processing remote sensing images by fusing elevation information according to claim 1, wherein a method for the preprocessing comprises: performing gridding on point cloud data with spectral bands in the obtained image data set through point cloud; and further comprises: outputting the spectral image data as four-band remote sensing image grid data containing R, G, B and elevation information by fusing a digital surface model to obtain the image set.

3. The method for processing remote sensing images by fusing elevation information according to claim 1, wherein a method for the region merging comprises: establishing similarity indexes fused with elevation information between adjacent super pixels on the basis of the pre-segmentation results, and performing merging region on over-segmented large-scale ground objects; and combining spectral information and elevation information during calculation of the similarity indexes.

4. The method for processing remote sensing images by fusing elevation information according to claim 3, wherein when the region merging is performed, adjacent clusters are updated in time by using a data structure of a neighborhood array, and labels of adjacent regions are stored by using a list with a variable length, and the region merging has low temporal complexity and low spatial complexity when being determined.

5. The method for processing remote sensing images by fusing elevation information according to claim 4, wherein a method for establishing the similarity index comprises: using a data structure of NA, and separately establishing a list with a variable length in each region for storing labels of adjacent regions.

* * * * *